United States Patent
Lam et al.

(10) Patent No.: US 6,661,827 B2
(45) Date of Patent: Dec. 9, 2003

(54) PUMPING SOURCE

(75) Inventors: Yee Loy Lam, Singapore (SG); Yuen Chuen Chan, Singapore (SG); Siu Chung Tam, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 10/196,664

(22) Filed: Jul. 15, 2002

(65) Prior Publication Data

US 2003/0016719 A1 Jan. 23, 2003

(30) Foreign Application Priority Data

Jul. 18, 2001 (EP) .............................. 01306186

(51) Int. Cl.⁷ ........................................... H01S 3/0941
(52) U.S. Cl. ........................................ 372/75; 372/36
(58) Field of Search ................. 372/75, 35, 36

(56) References Cited

U.S. PATENT DOCUMENTS

| | | | |
|---|---|---|---|
| 3,683,296 A | * 8/1972 | Scalise | 372/75 |
| 5,033,058 A | 7/1991 | Cabaret et al. | 372/75 |
| 5,040,187 A | 8/1991 | Karpinski | 372/50 |
| 5,128,951 A | 7/1992 | Karpinski | 372/50 |
| 5,216,688 A | 6/1993 | Kortz et al. | 372/75 |
| 5,521,936 A | 5/1996 | Irwin | 372/75 |
| 5,636,239 A | 6/1997 | Bruesselbach et al. | 372/70 |
| 5,978,407 A | 11/1999 | Chang et al. | 372/72 |

FOREIGN PATENT DOCUMENTS

| | | |
|---|---|---|
| EP | 0932227 A2 | 7/1999 |
| FR | 2783363 | 3/2000 |

OTHER PUBLICATIONS

Patent Abstracts of Japan, document No. JP 02130882.
Review Article "Laser Diode Pumped Solid State Lasers", Hughes et al., J. Phys. D: Appl. Phys. 25, 1992, pp. 563–586.

* cited by examiner

*Primary Examiner*—James Davie
(74) *Attorney, Agent, or Firm*—Perman & Green, LLP

(57) ABSTRACT

A pumping module for use in a solid state laser comprises an annular array of laser diode segments (10) forming a passage (24), each segment (10) comprising an extended body supporting a laser diode array (17) that extends along the longitudinal axis of the segment (10) for directing light into the passage (24) from an inner face (12) of the annular array, wherein adjacent side faces of any two segments (10) in the annular array are in sealing engagement. The inner faces (12) of the array of segments (10) form a continuous surface so that coolant can flow between a laser rod and the segments (10) to reduce localized heating.

9 Claims, 4 Drawing Sheets

PUMPING SOURCE

BACKGROUND TO THE INVENTION

Solid state lasers are those having a solid state laser rod as a central core, the laser rod being subjected to optical pumping provided by semiconductor laser diodes. The solid state laser rod is typically an insulating crystal grown with a small percentage of impurity atoms. The insulating crystal is typically yttrium aluminium garnet (YAG) and the impurities are typically neodymium (ND). The wavelength of the laser diode depends upon the size of the bandgap which can be controlled by the composition and the temperature of the laser rod.

The use of laser diodes to form a pump light source for a solid-state laser has been known for some time. Typically, laser diodes are disposed in the form of a laser bar which can be disposed parallel to the longitudinal axis of a, typically, cylindrical laser rod. There are inherent problems with this form of light source. In particular, the individual laser diodes can be subjected to excessive localised heating of one or more facets which can lead to their catastrophic optical failure. This therefore limits the output power which can be emitted from each laser bar and thus the output of the solid state laser.

It may be possible to increase the number of laser diode bars in order to increase the output power but this also results in increased localised heating. Furthermore, typical linear package designs limit the maximum number of laser diode bars and therefore the maximum possible output power.

It has been known to use optical elements to focus the emitted beam from the laser diode on to the solid state laser rod but the absorption (by the focussing means) of the emitted radiation leads to reduced pumping efficiency.

Pumping arrangements can be categorised into three forms: transverse, longitudinal and radial. Longitudinal pumping does not permit sufficient power to be directed to the laser rod for any useful output to be gained. Transverse and radial pumping typically suffers from the problems described above.

U.S. Pat. No. 5,216,688 discloses a pumping module in which individual laser diodes are mounted in an annular ring which can be placed around a central laser rod. In order to direct energy over any significant length of laser rod, it is necessary to use a significant number of these individual rings such that the overall construction of the solid state laser is complex and involves numerous individual parts. The complexity is further increased in that each ring is provided with an individual cooling channel for cooling the module.

U.S. Pat. No. 5,521,936 discloses a solid state laser in which a number of laser diodes are mounted between individual ring segments which, in turn, surround a cooling tube in which the laser rod is located. Cooling fluid is caused to flow between the laser rod and the cooling tube. However, the power directed by the laser diodes to the laser rod is restricted by the provision of an additional barrier, i.e. the cooling tube, between the diodes and the laser rod, thus reducing the efficiency of this device.

SUMMARY OF THE INVENTION

According to one aspect of the present invention, there is provided a pumping module for use in a solid state laser, the module comprising:

an annular array of laser diode segments forming a passage, each segment comprising an extended body supporting a laser diode array that extends along the longitudinal axis of the segment for directing light into the passage from an inner surface of the annular array, wherein adjacent side faces of any two segments in the annular array are in sealing engagement.

Thus, the present invention permits a greater number of laser diodes to be directed towards the laser rod and, as they are evenly spaced around the rod, the problems associated with localised heating of the laser rod can be reduced.

Each segment may have the cross-section of the sector of an annulus, although other cross-sections, for example trapezoidal, are possible.

Preferably, each laser diode segment comprises an anode and a cathode, between which the at least one laser diode bar is mounted. In this arrangement, it is preferable for the anode of one segment to be adjacent to the cathode of an a joining segment in order that there is a continuous electrical current path through the pumping module.

Preferably, the inner faces of the array of annular segments form a continuous surface such that, in use, a coolant can flow between the laser rod and the segments to reduce further the likelihood of localised heating. In other words, the cooling efficiency is greatly improved. The smooth continuous inner surface of the array of segments ensures that the flow of coolant is lamina. Outer faces of the array of annular segments may also be continuous and additional cooling means may be provided to the outer faces.

The close packing radial arrangement permits greater numbers of laser diode arrays to be used and this results in higher power being directed to the laser rod with a better uniformity. In general, the overall diameter of the pumping module, and therefore the solid state laser is smaller.

The inner face of each segment may be coated with diamond-like-carbon (DLC) for passivation which results in higher thermal conductivity between the pumping module and the coolant, thus leading to increased cooling of the laser rod. This coating also has a high transparency which will not effect the power transferred from the module to the laser rod.

A further advantage of the present invention is that individual pumping modules may be stacked to increase the pumping power to a laser rod. The use of conductors as the segments, i.e. the anode and the cathode, allows a series of connection of the laser bars and does not require contact soldering or wire bonding.

The pumping module may also be provided with an outer sleeve for surrounding the array of segments. Preferably the outer sleeve is heated, prior to placing it over the array of segments such that, having expanded on heating, it cools to clamp the segments together. The sleeve can also be used to clamp a series of arrays of segments which are arranged over the whole length of a laser rod.

Preferably, the inner faces of the segments, forming a smooth cylindrical surface, allow internal reflection of the light emitted by the laser bars. In this way, the efficiency of the device is greatly increased.

The outer face of the segment may also form a smooth continuous surface for engagement with the outer sleeve.

It is preferable that there are an odd number of sections in each array in order that no laser diode bar is directed exactly towards another one opposite to it.

According to another aspect of the present invention, there is provided a pumping module for use in a solid state laser, the module comprising an annular array of circumferentially spaced laser diode bars forming a passage, wherein adjacent side faces of any two laser diode bars are in sealing engagement.

BRIEF DESCRIPTION OF THE DRAWINGS

An example of the present invention will now be described in detail with reference to the accompanying drawings, in which.

DETAILED DESCRIPTION

Figure 1:
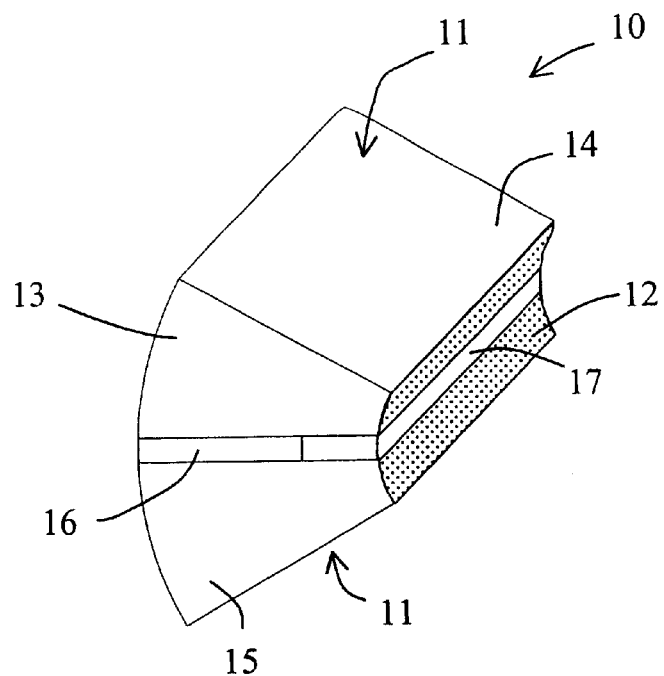
FIG. 1 is a perspective view of one segment of a pumping module according to the present invention.

As seen in FIG. 1, a segment 10 for use in a solid state laser is provided with two sides faces 11, an inner face 12 and an outer face 13. The inner face is preferably coated with DLC (not shown) to improve heat transfer. The segment 10 is comprised of anode 14 and an cathode 15. An isolator 16 and a laser bar 17 are located between the anode 14 and the cathode 15, the laser bar 17 being located such that it can emit light through the inner face 12.

Figure 2:
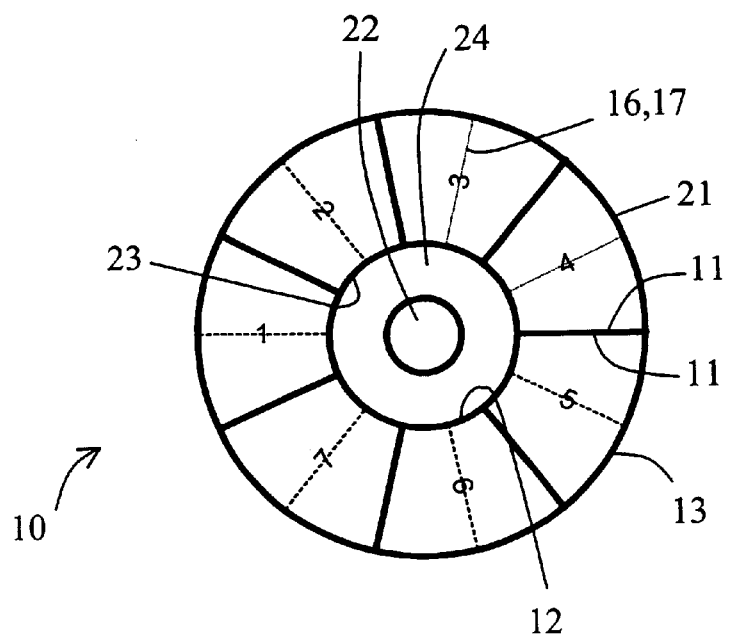
FIG. 2 is a schematic cross sectional view showing the arrangement of an array of segments shown in FIG. 1.

The cross sectional view of FIG. 2 shows a solid state laser 20 in which the segments 10 form an annular ring 21. The annular ring 21 is comprised, in this example, of seven segments, each segment having a single laser diode bar 17. More laser diode bars can be incorporated into the pumping module by reducing the size of each segment.

The annular ring 21 is disposed around a laser rod 22 such that the inner faces 12 of the segments 10 form the outer surface 23 of a smooth cylindrical passage 24 through which, in use, cooling fluid can be passed. The laser bars 17 are all directed towards the laser rod 22.

Figure 3A:
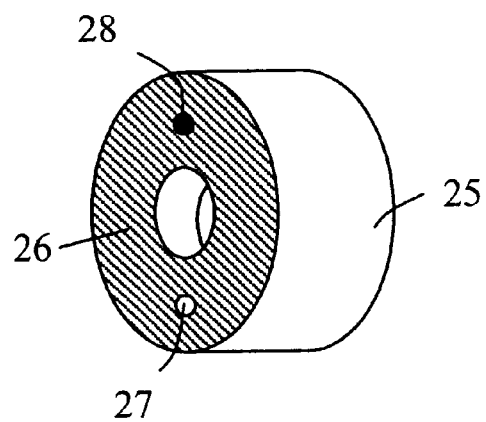
FIGS. 3A and 3B show the provision of the outer sleeve.
Figure 3B:
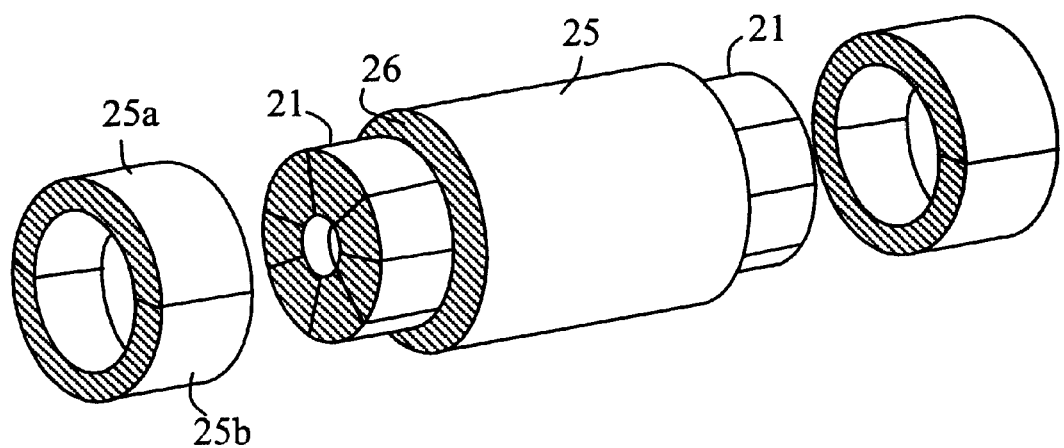

In FIG. 3, a number of annular rings 21 are shown. These rings are held together by an outer sleeve 25 which may be formed either as a single part or, in this example, in two sections 25a and 25b which may be clamped together. In order that multiple outer sleeves 25 can be used, each end face 26 of the sleeve 25 is provided with a projection 27 and a correspondingly shaped indent 28. When adjacent sleeves are abutted, the projection 27 on one sleeve should engage with the indent 28 on an adjacent sleeve to facilitate the stacking of these sleeves.

Figure 4:
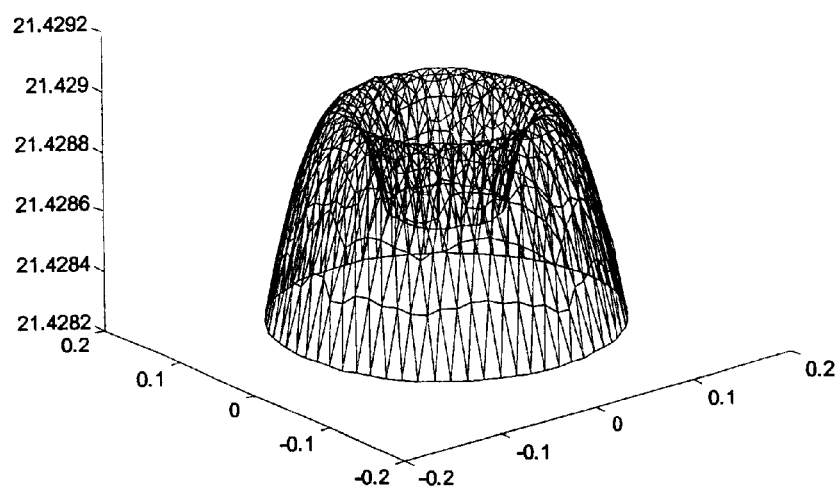
FIG. 4 shows the typical temperature distribution through a cross section of the pumping module according to the present invention; and, FIG. 5 shows the energy distribution in the laser rod for a pumping module having five laser diode bars.

FIG. 4 shows the typical temperature distribution through a cross section of a pumping module and it can be clearly seen that the variation from the inner surface to the outer surface of each segment is minimal.

Figure 5:
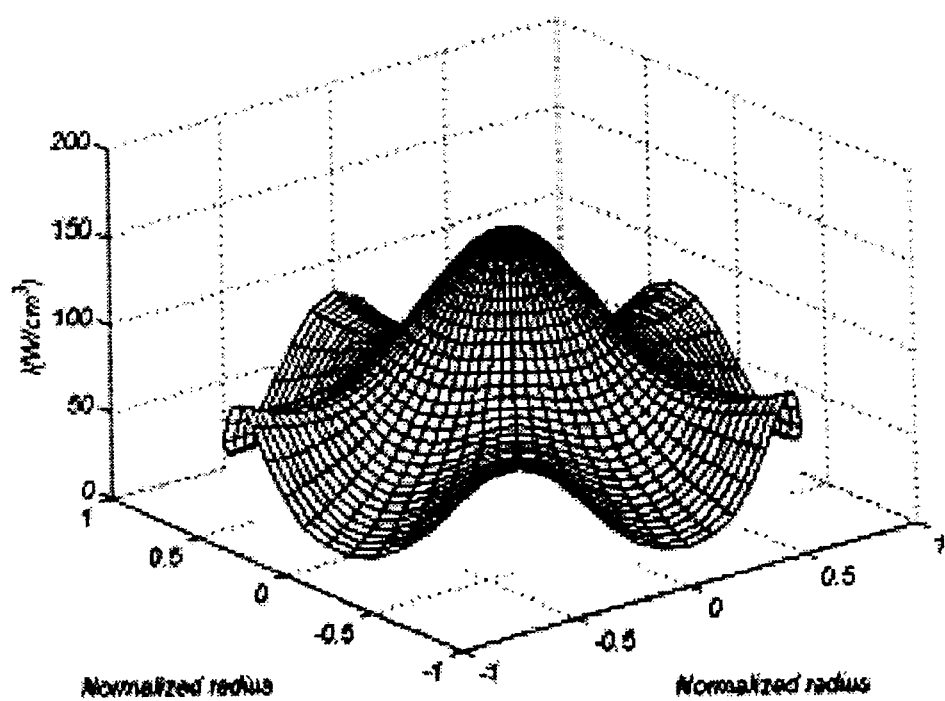

FIG. 5 gives an indication of the energy distribution in the laser rod when a pumping module having five laser diode bars is used. It can clearly be seen how the central portion of the laser rod will receive the greatest energy as it is being effected by the power emitted by all five of the laser diode bars. If the number of laser diode bars was increased, the variation in energy around the edge of the laser rod would be reduced, but the peak in the centre would increase.

What is claimed is:

1. A pumping module for use in a solid state laser, comprising an annular array of laser diode segments forming a passage, each segment comprising an extended body supporting a laser diode array that extends along the longitudinal axis of the segment for directing light into the passage from an inner surface of the annular array, the laser diode array being located between a first portion of the segment comprising an anode and a second portion of the segment comprising a cathode, wherein adjacent side faces of any two segments in the annular array are in sealing engagement, so that the anode of one segment abuts the cathode of an adjoining segment.

2. A pumping module according to claim 1, further comprising an outer sleeve for retaining the segments in the array.

3. A pumping module according to claim 1, wherein the number of segments is odd.

4. A pumping module according to claim 1, wherein the inner face of each segment is coated with diamond-like-carbon.

5. A pumping module according to claim 1, wherein the inner faces of each segment are internally reflective of pumping radiation.

6. A pumping module according to claim 1, in which each segment has the cross-section of a sector of an annulus.

7. A solid state laser comprising a laser rod fitted with a pumping module according to claim 1.

8. A solid state laser according to claim 7, further comprising a coolant within the passage defined by the pumping module.

9. A solid state laser comprising a laser rod fitted with a pumping module according to claim 2.

* * * * *